Patented May 18, 1937

2,080,768

UNITED STATES PATENT OFFICE 2,080,768

MANUFACTURE AND TREATMENT OF ARTIFICIAL PRODUCTS

George Holland Ellis, Robert Wighton Moncrieff, and Frank Brentnall Hill, Spondon, near Derby, England, assignors to Celanese Corporation of America, a corporation of Delaware No Drawing. Application September 12, 1934, Serial No. 743,712. In Great Britain September 27, 1933

4 Claims. (Cl. 8—20)

This invention relates to improvements in the manufacture of artificial threads, filaments, fibres, ribbons and the like, and in particular of materials of this type made from or containing saponified or partially saponified cellulose acetate or other cellulose esters.

We have found that saponification of materials of the type referred to above may very advantageously be effected by means of strong mineral alkalies if suitable organic substances of high molecular weight are introduced into the saponifying medium or applied to the materials prior to saponification.

According, therefore, to the present invention materials comprising filaments, threads, ribbons or the like of cellulose acetate or other saponifiable esters of cellulose are saponified by treating them with aqueous solutions of strong mineral alkalies in the presence of water-soluble organic compounds of high molecular weight.

Preferably the organic compound of high molecular weight is present in colloidal solution in the saponifying medium. Organic substances of high molecular weight containing a plurality of salt-forming groups, for example hydroxy groups or amino groups, or capable of ready decomposition into compounds containing such groups, have been found particularly suitable. Among such compounds particular mention may be made of carbohydrates, for example sucrose, glucose, and especially potato starch, dextrin, γ-cellulose and cellobiose, of egg albumen, casein and other albuminous substances, especially gelatin, and of leucine, aspartic acid, glutamic acid, proline, lysine, histidine and tyrosine. The organic substance introduced is preferably substantially neutral in reaction although capable of behaving as a very weak acid towards the saponifying agent. It is not essential, however, for the substance to be neutral. It may, for example, have a slight acid reaction. Amino acids and anhydro amino acids and substances readily decomposable in the saponifying medium to produce such acids or their salts are particularly suitable.

It is one of the advantages of the invention that the saponification effected may extend considerably below the surface of the material and may even be substantially uniform throughout the whole of the material. The saponification may or may not be carried out so as to remove the ester content completely, according to the particular object in view. Materials may be obtained by the process of the invention which have a high affinity for cotton dyes, while still retaining their affinity for dyes of the dispersed insoluble type. The process may raise the safe ironing point of the materials considerably, and may render them insoluble in solvents for the cellulose ester, for example acetone, and increase their penetrability to aqueous media. Moreover the process of the invention may increase the tenacity of the materials considerably and may improve their serimetric properties in other respects. Particularly when cellulose ester materials of initially high strength are saponified, the resulting materials may have a very great strength, for example three or four grams per denier or even more.

Any suitable method may be employed in the manufacture of the cellulose esters from which the filaments or other materials to be saponified are to be made. Particularly suitable are esterification processes in which little or no degradation of the cellulose molecule occurs. Among such processes special mention may be made of that described in U. S. Patent No. 1,708,787, in which esterification is effected in the presence of a large bulk of solvent for the ester produced, and particularly a weight of solvent exceeding six or eight times that of the cellulose undergoing esterification. Cellulose acetates employed as the base materials may have viscosities of the order of 30 up to 50 or even 100 or more, these figures being derived by comparison of the viscosity of a 6% solution of the cellulose acetate in acetone at 25° C. with that of glycerine taken as 100 at the same temperature. On the other hand, base materials of normal or even low viscosity, e. g. from 10 to 25, may be treated by the process of the invention. Similarly, in the case of other cellulose esters, the viscosities may be high, medium or low.

The invention is not limited in respect of the method of manufacture of the materials to be saponified. These may be made, for example, by the ordinary dry spinning process, or by a wet spinning process, or even by a combined wet-dry spinning process. The process may be such that the materials are at some stage subjected to a relatively high stretch. The materials produced by a wet or dry spinning process may, for example, be subjected, continuously with or subsequently to their production, to a stretching treatment in the presence of stretch-assisting agents, as described in U. S. Patent No. 1,709,470, and U. S. application S. No. 378,684, filed 16th July, 1929, or to the process described in U. S. application S. No. 573,424, filed 6th November, 1931, in which the stretching takes place in stages between which the tension is released.

The stretch produced may be of the order of 100% of the original length of the material, or may with advantage be as high as 300% or even 500% or more. The materials may be subjected to a relatively high stretch during the spinning operation itself. Thus, for example, in dry spinning, stretch-assisting agents of sufficiently low volatility to remain in the materials at least throughout the period of their formation may be introduced into the spinning solution, or stretch-assisting agents may be sprayed on to the materials or injected into the evaporative atmosphere during their formation. Again, in wet spinning processes, stretch-assisting agents may be introduced into the spinning solution and/or into the coagulating bath. Reference may be made to the spinning processes of U. S. applications S. Nos. 402,785 filed 26th October, 1929, 418,414 filed 3rd January, 1930, 437,423 filed 20th March, 1930, 469,622 filed 21st July, 1930, and 601,043 filed 24th March, 1932. As indicated above, the invention is not limited to the treatment of materials having any particular tenacities. Thus the tenacities may be characteristic of ordinary cellulose acetate silk. On the other hand, the material may have a considerably higher tenacity, which may for example be intermediate between that of ordinary cellulose acetate and natural silk or even greater than that of natural silk.

The saponifying agent is preferably caustic soda, but other alkaline compounds of alkali metals may be used, for example caustic potash or even strongly alkaline salts. The concentration and temperature of the saponifying agent should preferably be such that the desired degree of saponification can be effected in a treatment lasting a relatively short time, for example from 45 seconds or even less up to 1 or 2 minutes. It is an advantage of the present invention that it enables even complete saponification of cellulose ester materials which have been stretched to be effected in such short periods, without damaging the materials. The process may, in fact, increase the tensile strength of the materials. Excellent results have been obtained by the use of aqueous solutions containing one or two per cent. of caustic soda and 8–10% of gelatine, at temperatures between 60 and 75° C. Higher temperatures, for example 80–90° or even 100° C., and higher concentrations may be employed, provided the nature of the organic substance is not such that decomposition occurs to an undesirable extent under these conditions. It is not essential to avoid all decomposition of the organic substance, in fact some measure of decomposition may be advantageous with certain of the organic substances. Satisfactory results may also be obtained at lower temperatures and with lower concentrations of alkali, but if the temperature and concentration be unduly low, the time of treatment must be prolonged.

The saponifying agent may be applied to travelling materials, for example by passing the materials through a bath containing the saponifying agent and maintained at the desired temperature. The apparatus may be of the same general type suitable for stretching a warp of yarns in the presence of a stretch-assisting agent. The materials may be treated continuously with their production by a spinning process, and particularly a wet spinning process of the type referred to above. Although it is preferable to effect saponification while the material is passing through a bath of the saponifying agent, other methods may be employed. Thus, a simple batch process may be employed, the materials in the form of hanks or other packages being introduced into the saponifying medium and allowed to remain there for the time required to produce the desired saponification. When the materials to be treated are in the form of centrifugal-box-cakes, for example, as the result of a wet spinning process or a stretching process in which it is convenient to collect them in this way, saponification may even be effected while the materials are in cake form, as described, for example, in U. S. application S. No. 655,774, filed 8th February, 1933. As in the case of yarns and the like, so in the case of fabrics containing such yarns, it is preferable to apply the saponifying agent to the travelling materials, for instance while they are passing through a bath of saponifying agent maintained at the desired temperature. Batch methods, however, may also be employed. Saponification is preferably effected so that the materials are under relatively little applied tension, as described in U. S. application S. No. 668,070, filed 26th April, 1933. Thus in a continuous process the speed of the materials may diminish along their path so as to reduce the applied tension to a minimum. The invention includes processes for producing local saponification. Resists may, for example, be applied to the material treated so as to protect certain areas against the action of the saponifying medium. Threads may also be locally saponified, at intervals along their length.

The following examples illustrate the invention:—

*Example 1*

Ordinary cellulose acetate yarn is drawn from a creel and passed continuously through an aqueous bath containing 1 to 4% caustic soda and 5 to 10 parts gelatine at a temperature of 65 to 75° C., the speed of travel being such that the yarn is in contact with the bath for 1 to 3 minutes. After leaving the bath the yarn is washed, dried and collected by suitable means.

As a result of the treatment the yarn acquires an affinity for cotton dyes without losing its affinity for cellulose ester dyes. Further, the tenacity of the yarn is increased and its safe ironing point is raised.

*Example 2*

Cellulose acetate yarn which has been stretched so that it has a tenacity of 2.5 to 3.5 grams per denier is treated exactly as described in Example 1. As a result of the treatment the tenacity of the yarn is still further increased.

As indicated above, particularly valuable dyeing properties may result from the process of the invention, and the invention includes the dyeing of the saponified materials, for example, by means of cotton dyes, or in the case of materials which retain an affinity for cellulose ester dyes, by means of such dyes, for example dyes of the dispersed insoluble type, indigoid dyes, basic dyes, and azoic dyes. On such materials, special effects may be produced by the application of dyes having an affinity for regenerated cellulose and dyes having an affinity for cellulose esters, together or separately.

Although the invention has been described with particular reference to the treatment of materials made of or containing cellulose acetate, materials comprising other saponifiable cellulose esters, for example cellulose formate, propionate and butyrate, mixed ether-esters, for example ethyl cellulose acetate and oxy-ethyl cellulose acetate, and esters containing inorganic groups, for example cellulose nitroacetate, may also be treated.

What we claim and desire to secure by Letters Patent is:—

1. Process for the saponification of materials comprising filaments, threads, ribbons and the like of organic esters of cellulose, which comprises treating the materials with an aqueous solution of a strong mineral alkali in the presence of a salt of an amino acid with said alkali.

2. Process for the saponification of materials comprising filaments, threads, ribbons and the like of cellulose acetate, which comprises treating the materials with an aqueous solution of a strong mineral alkali in the presence of a salt of an amino acid with said alkali.

3. Process for the saponification of materials comprising filaments, threads, ribbons and the like of organic esters of cellulose, which comprises treating the materials with an aqueous solution of a strong mineral alkali in the presence of a salt of said alkali with an amino acid selected from the group consisting of leucine, aspartic acid, lysine, glutamic acid, histidine, proline and tyrosine.

4. Process for the saponification of materials comprising filaments, threads, ribbons and the like of cellulose acetate, which comprises treating the materials with an aqueous solution of a strong mineral alkali in the presence of a salt of said alkali with an amino acid selected from the group consisting of leucine, aspartic acid, lysine, glutamic acid, histidine, proline and tyrosine.

GEORGE HOLLAND ELLIS.
ROBERT WIGHTON MONCRIEFF.
FRANK BRENTNALL HILL.